O. A. DERICCO.
AUTOMOBILE WINDSHIELD WIPER.
APPLICATION FILED APR. 25, 1921.

1,400,665.
Patented Dec. 20, 1921.

INVENTOR
O. A. DERICCO

ATTYS.

UNITED STATES PATENT OFFICE.

OSCAR A. DERICCO, OF SAN FRANCISCO, CALIFORNIA.

AUTOMOBILE WINDSHIELD-WIPER.

1,400,665.      Specification of Letters Patent.     Patented Dec. 20, 1921.

Application filed April 25, 1921. Serial No. 464,192.

*To all whom it may concern:*

Be it known that I, OSCAR A. DERICCO, a citizen of the United States, residing at San Francisco, in the county of San Francisco and State of California, have invented new and useful Improvements in Automobile Windshield-Wipers, of which the following is a specification.

The present invention relates to improvements in apparatus for wiping automobile windshields so as to remove rain and other forms of moisture therefrom whereby clear vision through the shield may be had at all times.

The primary object of the invention is to provide a device of the character described in which the windshield wiping element is power operated and moves back and forth over the glass, the operation being effected by electrical means controlled by a suitable switch, which may be mounted on the steering wheel, whereby the driver may readily and easily set the device into operation at will.

A further object is to provide a device of the character described which may be readily attached to an automobile without necessitating any changes in the construction of the automobile, the device being so disposed as to not be in the way or obstruct the driver's vision.

Another object is to provide a comparatively simple, inexpensive, reliable and compact device of the character described which has novel means for moving the wiper back and forth over the front of the windshield.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawing:

Figure 1 is a front elevation of the invention shown attached to a windshield.

Fig. 2 is a bottom plan view of the device removed from the shield.

Fig. 3 is a longitudinal vertical section showing parts broken away.

Fig. 4 is a cross section taken on line 4—4 of Fig. 3, enlarged.

Fig. 5 is a cross section taken through the device as shown in Fig. 4, looking toward the wiping member.

Fig. 6 is a plan view partly in section of a detail of the invention.

Fig. 7 is a fragmentary plan view of the belt link and abutment member.

Fig. 8 is a bottom plan view of the detail shown in Fig. 7.

Fig. 9 is a sectional view of the belt link shown in Figs. 7 and 8.

Referring to the accompanying drawings in which I have shown one embodiment of the invention, the device comprises a frame in the form of a tubular body 1, power means in the form of an electric motor 2 secured to one end of the frame, brackets 3 carried by the frame or body for attaching the device to the upper edge of the windshield, a wiper element 4 extending downwardly from the body and means 5 for moving the wiper back and forth when the motor is operated. The tubular body 1 extends for the length of the windshield 6 along the upper edge thereof, being supported thereon by the brackets 3 which engage over the upper edge of the windshield frame 7 and have set screws 8 which provide for holding the brackets in place. The under side of the body 1 has a longitudinal slot or opening 9 therein to provide for attachment of the wiper 4. The motor 2 is secured by suitable means 10 to one end of the body 1 and has a gear or pinion 11 on its shaft 12, which pinion 11 meshes with a gear 13 carried on the body 1. The gear 13 is fixed to a shaft 14 which latter is mounted in a bearing 15 fixed inside of the body 1. A pulley 16 is fixed to and is rotated by the shaft 14. At the other end of the body is a fixed bearing 17 having a slot 18 in which a shaft 19 is adjustably mounted. A bearing 20 supports the shaft 19 and is longitudinally adjustably mounted on the bearing 17. A handle 21 is carried by the bearing 20 and provides for adjusting said bearing. A set screw 22 operating in a slot 23 on the housing is attached to the bearing 20 and provides for holding the bearing in adjusted position.

An endless belt 24 is mounted on the pulley 16 and on a pulley 25 on the shaft 19. The tension of the belt is regulated by the adjustable bearing 20 and its associated parts.

A guide rod 26 extending longitudinally in the housing from the bearing 17 to the one 15 is attached at its ends to said bearing. A slide member 27 is mounted to slide back and forth on the guide rod. Secured by screws 28 to a portion of the slide member is the wiper 4. The wiper comprises a metal rod 29 having a rubber wiping strip 29′ on one side, arranged to engage the outer side of the upper half of the windshield.

Angular arms 30 and 31 are carried by the slide member and extend over the inner and outer runs of the endless belt, said arms having inturned portions 31′ arranged to engage the side edges of said runs to hold the belt under the arms.

Carried by the slide member are spring urged detents 32 and 33 which are disposed opposite the arms 30 and 31 so that the inner and outer runs of the belt pass between the arm 30 and detent 32 and arm 31 and detent 33. The detents are each in L shaped form and slidably mounted in sockets 34 on the slide member, so that certain arms 35 thereof extend toward the belt and other arms 36 project outwardly and upwardly so as to be engaged by releasing cams 37 and 38 carried by the bearings 15 and 17. Springs 39 in the sockets urge the arms 35 outwardly toward the belt.

The endless belt is joined by a link and abutment member 40 which comprises a metal body 41 secured by suitable fastening means 42 to the ends of the belt. A pin 43 is slidable in an opening 44 in the body 41 and has a curved projection 45 on one end and a stop pin 46 extending through the pin adjacent its other end. The projection 45 on the pin 43 is adapted to be engaged by the detents 32 and 33 and the other end of the pin is adapted to ride upon the beveled inner faces 47 of the arms 30 and 31 so as to move the pins whereby the projections 45 will be in position to engage the detents 32 and 33. Suitable electrical connections, not shown, of which the conductors 48, shown in Figs. 1 and 2, will be a part, lead from a source of current and may be attached to the motor. The switch, not shown, for controlling the motor may be mounted on the steering wheel in the customary manner of electric horns, etc., and it is not thought necessary to illustrate this well known expedient.

*Operation.*

When it is desired to wipe and clear the windshield, the motor is operated and through the gears 11 and 13 causes the endless belt to run. When the pin 43 on the link 40, for example, engages the inclined face 47 of the arm 30, the projection 45 on the pin is moved to engage the detent 32 on the slide member 27. By this engagement the slide member is moved toward the pulley 25 and the wiper is moved across the glass of the windshield. When the slide member is moved to the end of the guide rod the arm 36 of the detent 32 engages the cam member 37 and is pushed inwardly so as to withdraw the detent 32 from engagement with the projection 45 on the link 40. The link now moves past the slide member around the pulley 25 and when upon the other side of the pulley the pin 43 will engage the arm 31 on the other side of the slide member and cause the projection 45 to engage the detent 33 on said slide member. Thus the slide member and wiper move back across the shield toward the other end of the body 1 and when the slide member reaches said other end the cam 38 releases the pin 43 and the operation is repeated when the pin moves around the pulley 16 and again engages the arm 30 and detent 32. Thus as long as the motor is operated the wiper will be moved back and forth across the shield, intermittently, and in this way a thorough wiping and clearing of the shield may be quickly and easily effected by the driver, at will. When the motor is stopped the wiper ceases to move. It is only necessary for the driver to close the circuit for the motor and the wiping, to the extent desired, takes place automatically. The cam members 37 and 38 are each provided with notched sides 49. The notches of each receive the arms 36 of the openings so as to hold said detents in withdrawn position during the time that the belt carried member passes around the pulley.

I claim:

1. A device for wiping automobile windshields comprising a body member adapted to extend across the upper side of a windshield, a motor on the body, an endless belt on the body member, a slide member on the body adapted to support a wiping element, spring urged detents on said slide member, a member on the belt arranged to engage said detents so as to move said slide member, and means on the body to engage said detents and move the same out of engagement with said belt carried member.

2. A device for wiping automobile windshields comprising a body member adapted to extend across the upper side of a windshield, a motor on the body member, a guide rod on the body, a slide member reciprocally mounted on the guide rod and adapted to support a wiping element, an endless belt operated by said motor, spring urged detents on said slide member, a member on the belt adapted to be moved into position to engage said detents, means carried by said slide member adapted to engage and move said belt carried means into position to engage said detents and means on the body adjacent opposite ends of said belt for causing said detents to be moved free of engagement with said belt carried member.

3. A device for wiping automobile wind shields comprising a body member adapted to extend across a wind shield, a motor on the member, an endless belt operated by said motor and supported by the body member, a slide member movable back and forth on the body and adapted to support a wiping element, means for connecting said belt and slide member for corresponding movement, comprising members carried on the slide member and belt respectively and arranged to be moved into and out of coöperative position, means for moving said members into coöperative position and means operating when the slide member is moved to the extent of its movement in either direction for disengaging said members.

OSCAR A. DERICCO.